US005161726A

United States Patent [19]

Francis

[11] Patent Number: 5,161,726

[45] Date of Patent: Nov. 10, 1992

[54] SPOTWELD REMOVER TOOL

[76] Inventor: Timothy G. Francis, 150 Dennis Dr., Lexington, Ky. 40503

[21] Appl. No.: 708,349

[22] Filed: May 31, 1991

[51] Int. Cl.[5] .............................................. B23B 51/02

[52] U.S. Cl. ........................................ 228/19; 228/57; 408/225

[58] Field of Search ................... 228/119, 125, 13, 19, 228/57; 408/223-225, 230

[56] References Cited

U.S. PATENT DOCUMENTS

| | | | |
|---|---|---|---|
| 1,229,565 | 6/1917 | Ahlgren | 408/224 |
| 1,621,471 | 3/1927 | Simmons | 408/224 |
| 1,648,802 | 11/1927 | Gairing | 408/224 |
| 2,786,218 | 3/1957 | Yousem | 408/224 |
| 4,645,384 | 2/1987 | Shimomura et al. | 408/224 |
| 4,826,104 | 3/1958 | Morin | 408/224 |
| 4,997,322 | 3/1991 | Wells et al. | 408/225 |

FOREIGN PATENT DOCUMENTS

| | | | |
|---|---|---|---|
| 1073276 | 1/1960 | Fed. Rep. of Germany | 408/224 |
| 299798 | 9/1954 | Switzerland | 408/224 |

OTHER PUBLICATIONS

Machinery's Handbook Revised 21st Edition, "Milling Cutters", pp. 1603,04 copyright 1979.

Advertisement for "Spotle", N.C.G. Company, Anaheim Calif., Jan. 1984.

Advertisement for "Rotabroach Cutters". Date unknown, but predates invention.

Advertisement for "Blaircutters & Spotweld Cutters". Date unknown, but predates invention.

Advertisement for "Spot-Eze" Spot Weld Drill Kit. Date unknown, but predates invention.

*Primary Examiner*—Samuel M. Heinrich

*Attorney, Agent, or Firm*—John H. Crozier

[57] ABSTRACT

In a preferred embodiment, a cutting tool mountable in a rotatable chuck and having a cylindrical cutting member with a cutting surface orthogonal to the axis of the cutting member. The cutting surface includes at least 8 cutting flutes defined therein. The cutting flutes are rounded at the outer periphery of the cutting surface so as to permit chips to clear the cutting surface as the tool is used.

7 Claims, 1 Drawing Sheet

SPOTWELD REMOVER TOOL

BACKGROUND OF THE INVENTION

1. Field of the Invention

The present invention relates to means for removing spotwelds generally and, more particularly to a novel rotary tool for removing spotwelds on metal parts as are found, for example, in automobile bodies and the like.

2. Background Art

Especially in the field of automobile body repair, it is often necessary to remove damaged sheet metal panels or or remove such panels for access to other parts of the automobile. Typically, these sheet metal panels are attached to other sheet metal panels or metal structural members by means of spotwelding.

There are three types of conventional tools available to assist in removing spotwelded sheet metal panels. One type is a drill with a clamping fixture having one leg which fits about the spotweld to apply pressure from the opposite side of the area of the spotweld to force the drill into the spotweld. Apart from being relatively expensive, this tool requires that access be had to the rear of the spotwelded area, requiring either that use of the tool be limited to those areas where such access is present or that a portion of the panel be cut away to permit the access. The latter requires additional labor and may preclude re-use of the panel if re-use is desired. Also, use of the tool is limited by the depth of the clamping fixture. A second type of tool is essentially a circle cutter which cuts a circle in the sheet metal panel to be removed, thus freeing the panel but leaving a plug of the panel with the spotweld thereon attached to whatever the panel had been welded. A disadvantage of this type of tool is that additional labor is required to grind away the plug before a new panel can be installed. A third type of tool for removing spotwelds is a cutter having two cutting edges at the face thereof and having a pilot drill disposed along the center axis and extending outwardly from the face thereof to center and guide the cutter into the spotweld, thus cutting away the spotweld and a small portion of the sheet metal panel. While this type of tool is relatively inexpensive, it has been found that it dulls easily, dulling being noticeable after removing only about 25 spotwelds, which requires that greater force be used to remove spotwelds. A total of about 150 spotwelds may be removed before the tool must be resharpened or replaced. Additionally, the tool must be used at relatively low rotational speeds, less than 600 rpm, since it is prone to breakage if it snags on the edge of the sheet metal. One manufacturer of the latter type of tool recommends not tightening the chuck of the drill very tight so that the cutting tool can spin in the chuck if it snags. That, of course, greatly limits the amount of force that can be applied, thus increasing cutting time.

Accordingly, it is a principal object of the present invention to provide a tool for removing spotwelds which can be used to remove a large number of spotwelds before being sharpened or replaced.

It is a further object of the invention to provide such a tool that is easily and economically constructed.

It is an additional object of the invention to provide such a tool that can be used at relatively high speeds.

Other objects of the present invention, as well as particular features, elements, and advantages thereof, will be elucidated in, or be apparent from, the following description and the accompanying drawing figures.

SUMMARY OF THE INVENTION

The present invention achieves the above objects among others, by providing, in a preferred embodiment, a cutting tool mountable in a rotatable chuck and having a cylindrical cutting member with a cutting surface orthogonal to the axis of the cutting member. The cutting surface includes at least 8 cutting flutes defined therein. The cutting flutes are rounded at the outer periphery of the cutting surface so as to permit chips to clear the cutting surface as the tool is used.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
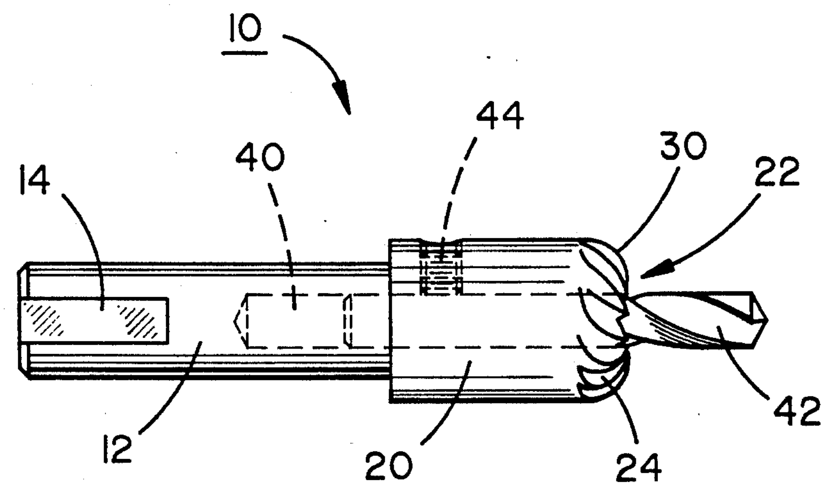
FIG. 1 is a side elevational view of the spotweld remover tool of the present invention including a pilot drill mounted therein.
Figure 2:
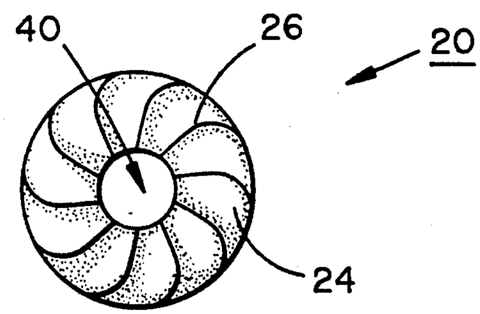
FIG. 2 is a end elevational view of the tool of FIG. 1 without a pilot drill.
Figure 3:
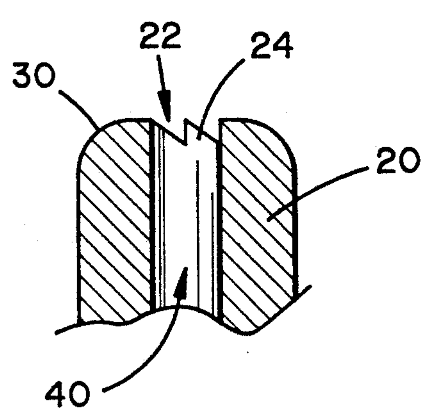
FIG. 3 is a cross-sectional view taken along the line "3—3" of FIG. 2.

Referring now to the Drawing, in which similar or identical elements are given consistent identifying numerals throughout the various figures thereof, there is illustrated a spotweld remover tool according to the present invention, generally indicated by the reference numeral 10.

Tool 10 includes a cylindrical shank portion 12 for insertion into the chuck of a conventional rotary air or electric drill (neither shown). Shank portion 12 may have axial flats 14 (only one shown) formed in the surface thereof and radially spaced apart by 120 degrees to assist in holding tool 10 in the chuck.

Formed integrally with shank portion 12 is a cylindrical cutting member 20 having a cutting face 22 orthogonal to the axis of the cutting member and including a plurality of curved cutting flutes, such as cutting flute 24, defining therebetween a plurality of cutting teeth, as at 26, the cutting teeth being rounded at their distal ends to form a convex rounded shoulder 30 at the outer periphery of face 22. For a cutting member 20 having a diameter of ⅜ inch, the rounding radius may be about 3/32 inch and the axial depth of cutting flutes 24 may be about 0.015–0.020 inch. Rounded shoulder 30 helps chips clear cutting face 22 as tool 10 is used.

Defined within tool 10 concentric with the central axis thereof is a cylindrical channel 40 within which is fixedly disposed (FIG. 1 only) a pilot drill 42 secured in place by means of a set screw 44, the pilot drill being provided to help guide cutter 20 into a spotweld (not shown).

Tool 10 is shown as having 10 cutting flutes, but nay have a greater or lesser number. It is preferable, however, that the number of cutting flutes not be less than about 8.

It has been found that tool 10 has a long life expectancy, cutting effectively up to about 4,000 spotwelds, and resists snagging on the edge of metal being cut therewith. It may be used at speeds up to about 1000 rpm.

Tool 10 may be constructed of any suitable tool steel by conventional methods and then heat treated to a Rockwell "C" hardness of about 63–65.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A tool for removing spotwelds, comprising:

(a) a cylindrical cutting member having proximal and distal ends;

(b) an elongate cylindrical shaft integral with the proximal end of said cutting member and extending coaxially therefrom;

(c) the distal end of said cutting member terminating in a cutting face orthogonal to the axis of said cutting member; and (d) at least about 8 cutting flutes defined in said cutting face defining therebetween at least 8 cutting teeth; and (e) each of said cutting teeth having a flat central portion in said cutting face and a rounded portion extending from said flat central portion to the periphery of said cutting member so as to form, in profile, a rounded shoulder at the periphery of said cutting face.

2. A tool for removing spotwelds, as defined in claim 1, further comprising a pilot drill extending from the distal end of said cutter along the axis thereof.

3. A tool for removing spotwelds, as defined in claim 1, wherein the number of cutting flutes is 10.

4. A tool for removing spotwelds, as defined in claim 1, wherein the diameter of said cutting member is about ⅜ inch and the radius of said convex rounded shoulder is about 3/32 inch.

5. A tool for removing spotwelds, as defined in claim 1, wherein the diameter of said cutting member is about ⅜ inch and the axial depth of said cutting flutes is about 0.015–0.020.

6. A tool for removing spotwelds, as defined in claim 1, wherein the radial width of said flat central portion of each of said cutting teeth is approximately one-half the total radial width of said each of said cutting teeth.

7. A tool for removing spotwelds, as defined in claim 1, wherein the axial depth of said cutting flutes is on the order of one twentieth of the diameter of said cutting member.

* * * * *